(12) United States Patent
Zhou et al.

(10) Patent No.: US 11,176,235 B2
(45) Date of Patent: Nov. 16, 2021

(54) PERMISSION CONTROL METHOD AND RELATED PRODUCT

(71) Applicant: GUANGDONG OPPO MOBILE TELECOMMUNICATIONS CORP., LTD., Guangdong (CN)

(72) Inventors: Yibao Zhou, Dongguan (CN); Xueyong Zhang, Dongguan (CN); Haitao Zhou, Dongguan (CN); Cheng Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 109 days.

(21) Appl. No.: 16/630,796

(22) PCT Filed: Jun. 19, 2018

(86) PCT No.: PCT/CN2018/091874
§ 371 (c)(1),
(2) Date: Jan. 13, 2020

(87) PCT Pub. No.: WO2019/011109
PCT Pub. Date: Jan. 17, 2019

(65) Prior Publication Data
US 2020/0167452 A1    May 28, 2020

(30) Foreign Application Priority Data

Jul. 14, 2017   (CN) .......................... 201710580192.1

(51) Int. Cl.
*G06F 21/00*    (2013.01)
*G06F 21/32*    (2013.01)
*G06F 21/54*    (2013.01)

(52) U.S. Cl.
CPC .............. *G06F 21/32* (2013.01); *G06F 21/54* (2013.01); *G06F 2221/031* (2013.01)

(58) Field of Classification Search
None
See application file for complete search history.

(56) References Cited

U.S. PATENT DOCUMENTS

2009/0309698 A1* 12/2009 Headley .............. H04L 63/0861
340/5.52
2010/0138666 A1*  6/2010 Adams .................... G06F 21/32
713/186

(Continued)

FOREIGN PATENT DOCUMENTS

CN    102810154 A    5/2012
CN    103886283 A    6/2014

(Continued)

OTHER PUBLICATIONS

Kaur, Manvjeet; Sofat, Sanjeev. Fuzzy vault template protection for multimodal biometric system. 2017 International Conference on Computing, Communication and Automation (ICCCA). https://ieeexplore.ieee.org/stamp/stamp.jsp?tp=&arnumber=8229966 (Year: 2017).*

(Continued)

*Primary Examiner* — Jeremiah L Avery

(57) ABSTRACT

Disclosed are a permission control method and a related product, relating to the technical field of mobile terminals. The method comprises: a mobile terminal (200) using a processor (110) to notify, where it is determined that an operation requested by a user is of a pre-set operation type, more than one biological identification module of the mobile terminal to acquire N pieces of biological information about the user; and then, the processor (110) matching the N pieces of biological information with a pre-set biological information template, and if the N pieces of biological information (Continued)

all successfully match the pre-set biological information template, executing the operation requested by the user.

20 Claims, 7 Drawing Sheets

(56) References Cited

U.S. PATENT DOCUMENTS

| | | | |
|---|---|---|---|
| 2013/0236066 A1 | 9/2013 | Shubinsky | |
| 2014/0193045 A1 | 7/2014 | Otis | |
| 2014/0355842 A1 | 12/2014 | Otis et al. | |
| 2015/0186634 A1* | 7/2015 | Crandell | G06F 21/32 |
| | | | 713/186 |
| 2017/0063852 A1 | 3/2017 | Azar et al. | |
| 2017/0193208 A1* | 7/2017 | Ashley | H04L 63/0861 |
| 2018/0004924 A1* | 1/2018 | Tieu | G06F 21/6218 |
| 2018/0048645 A1* | 2/2018 | Ionita | G06K 9/22 |
| 2018/0211020 A1 | 7/2018 | Fukuda | |
| 2018/0309792 A1* | 10/2018 | Obaidi | G06F 21/32 |
| 2019/0188367 A1 | 6/2019 | Fukuda | |

FOREIGN PATENT DOCUMENTS

| | | |
|---|---|---|
| CN | 103927658 A | 7/2014 |
| CN | 105224936 A | 1/2016 |
| CN | 105389703 A | 3/2016 |
| CN | 105530267 A | 4/2016 |
| CN | 105590045 A | 5/2016 |
| CN | 106570370 A | 4/2017 |
| CN | 107437009 A | 12/2017 |
| WO | 2017010305 A1 | 1/2017 |

OTHER PUBLICATIONS

Wang, Zhifang et al. Template Protection for Multimodal Biometric System. 2009 Fifth International Conference on Intelligent Information Hiding and Multimedia Signal Processing. https://ieeexplore.ieee.org/stamp/stamp.jsp?tp=&arnumber=5337519 (Year: 2009).*
Supplementary European Search Report in the European application No. 18832015.4, dated Mar. 9, 2020.
English Translation of the Written Opinion of the International Search Authority in the international application No. PCT/CN2018/091874, dated Jul. 31, 2018.
Notice of Allowance of the Chinese application No. 201710580192.1, dated Nov. 1, 2019.
International Search Report in the international application No. PCT/CN2018/091874, dated Jul. 31, 2018.
First Office Action of the Chinese application No. 201710580192.1, dated Apr. 18, 2019.
Second Office Action of the Chinese application No. 201710580192.1, dated Jul. 15, 2019.
Office Action of the Indian application No. 202017002474, dated Sep. 15, 2021.

* cited by examiner

PERMISSION CONTROL METHOD AND RELATED PRODUCT

CROSS-REFERENCE TO RELATED APPLICATIONS

The application is the U.S. national phase of International Application No. PCT/CN2018/091874 filed on Jun. 19, 2018, which claims priority to Chinese Patent Application No. 201710580192.1, filed to the Chinese Patent Office on Jul. 14, 2017. The disclosures of these applications are incorporated herein by reference in its entirety.

TECHNICAL FIELD

The disclosure relates to the technical field of mobile terminals, and in particular to a permission control method and a related product.

BACKGROUND

With the development of a mobile terminal technology, mobile terminals have played an increasingly important role in people's lives. In life, it has become more and more convenient to use mobile terminals for payment, office and other activities.

However, while mobile terminals bring convenience to people's lives, they also pose threats to information security and threats to property security. In order to improve the security level of a mobile terminal, a fingerprint recognition technology is applied to the mobile terminal. After fingerprint verification is passed, a user can perform operations such as paying and checking E-mail, and the security level of the mobile terminal is improved to some extent.

However, with the wide application of the fingerprint recognition technology, security vulnerabilities for fingerprint recognition, such as fake fingers and fingerprint films, have emerged. Therefore, fingerprint recognition is insufficient to ensure the security of mobile terminals of users.

SUMMARY

The embodiments of the disclosure provide a permission control method and a related product, which may improve the security of a mobile terminal and avoid information leakage or property loss caused by the mobile terminal being maliciously operated.

According to a first aspect of the embodiments of the disclosure, a mobile terminal is disclosed. The mobile terminal may include a processor and a plurality of biological recognition modules. The processor may be connected to the plurality of biological recognition modules.

The processor may be configured to notify, responsive to determining that an operation requested by a user is of a preset operation type, the plurality of biological recognition modules to acquire biological information of the user.

The plurality of biological recognition modules may be configured to acquire N pieces of biological information of the user, and transmit the N pieces of biological information to the processor, N being a positive integer more than 1.

The processor may be further configured to match each of the N pieces of biological information with a respective one of preset biological information templates, and perform, responsive to each of the N pieces of biological information being successfully matched with the respective one of preset biological information templates, the operation requested by the user.

According to a second aspect of the embodiments of the disclosure, a permission control method is disclosed. The method may include the following operations.

An operation requested by a user is acquired, and it is determined whether the operation requested by the user is of a preset operation type.

responsive to the operation requested by the user being of the preset operation type, N pieces of biological information of the user are acquired, N being a positive integer more than 1.

Each of the N pieces of biological information is matched with a respective one of preset biological information templates, and responsive to each of the N pieces of biological information being successfully matched with a respective one of the preset biological information templates, the operation requested by the user is performed.

According to a third aspect of the embodiments of the disclosure, a permission control method is disclosed. The method may include a processing unit and a plurality of biological recognition units.

The processing unit may be configured to notify, responsive to determining that an operation requested by a user is of a preset operation type, the plurality of biological recognition units to acquire biological information of the user.

The plurality of biological recognition units may be configured to acquire N pieces of biological information of the user, and transmit the N pieces of biological information to the processing unit, N being a positive integer more than 1.

The processing unit may be further configured to match each of the N pieces of biological information with a respective one of preset biological information templates, and perform, responsive to each of the N pieces of biological information being successfully matched with the respective one of preset biological information template, the operation requested by the user.

According to a fourth aspect of the embodiments of the disclosure, a mobile terminal is disclosed, which includes a processor, a memory, a communication interface and one or more programs. The one or more programs are stored in the memory and configured to be executed by the processor. The programs include instructions configured to perform the operations in the method in the above second aspect.

According to a fifth aspect of the embodiments of the disclosure, a computer-readable storage medium is disclosed, which stores computer programs configured for electronic data exchange, the computer programs enabling a computer to execute the method in the above second aspect and the computer including a mobile terminal.

According to a sixth aspect of the embodiments of the disclosure, a computer program product is disclosed, which includes a non-transitory computer-readable storage medium including computer programs, the computer program being operated to enable a computer to perform part or all of the operations described in the method in the above second aspect of the embodiments of the disclosure. The computer program product may be a software installation package, and the computer includes a mobile terminal.

In the embodiments of the disclosure, a mobile terminal uses a processor to notify, if it is determined that an operation requested by a user is of a preset operation type, a plurality of biological recognition modules of the mobile terminal to acquire N pieces of biological information of the user; and then, the processor matches each of the N pieces of biological information with a respective one of preset biological information templates, and performs, if the N pieces of biological information are all successfully matched with the preset biological information templates, the operation requested by the user. Therefore, a user can perform an operation of a preset operation type only under the condition that N pieces of biological information are all successfully matched. It can be seen that by the implementation of the embodiments of the disclosure, the security of a mobile terminal can be improved, and information leakage or property loss caused by the mobile terminal being maliciously operated can be avoided.

BRIEF DESCRIPTION OF DRAWINGS

In order to describe the technical solutions in the embodiments of the disclosure more clearly, the drawings for describing the embodiments will be briefly introduced below. It is apparent that the drawings described below are only some embodiments of the disclosure. Those of ordinary skill in the art may also obtain other drawings according to these drawings without creative work.

DETAILED DESCRIPTION

In order to make the purposes, technical solutions and advantages of the disclosure clearer, the disclosure will be further described in detail below in combination with the drawings. It is apparent that the described embodiments are not all embodiments but only part of embodiments of the disclosure. All other embodiments obtained by those of ordinary skill in the art based on the embodiments in the disclosure without creative work shall fall within the scope of protection of the disclosure.

Terms "first", "second" and the like in the specification, claims and drawings of the disclosure are adopted not to describe a specific sequence but to distinguish different objects. In addition, terms "include" and "have" and any transformation thereof are intended to cover nonexclusive inclusions. For example, a process, method, system, product or device including a series of operations or units is not limited to the listed operations or units, but may optionally further include operations or units that are not listed, or optionally further includes other operations or units intrinsic to the process, the method, the product or the device.

A mobile terminal involved in the embodiments of the disclosure may include various handheld devices with a wireless communication function, vehicle-mounted devices, wearable devices, computing devices or other processing devices connected to modems, and User Equipment (UE), Mobile Stations (MSs), terminal devices and the like in various forms. For convenient description, the devices mentioned above are collectively referred to as mobile terminals. The embodiments of the disclosure will be introduced below in combination with the drawings.

The embodiments of the disclosure provide a permission control method and a related product, which may improve the security of a mobile terminal and avoid information leakage or property loss caused by the mobile terminal being maliciously operated. The details will be described separately below.

Figure 1:
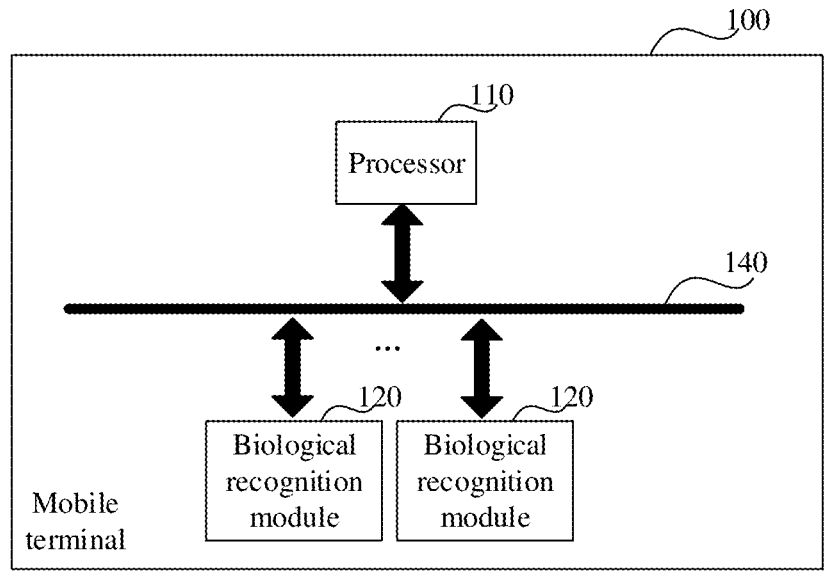
FIG. 1 is a structure diagram of a mobile terminal according to an embodiment of the disclosure.

Please refer to FIG. 1. FIG. 1 is a structure diagram of a mobile terminal 100 according to an embodiment of the disclosure. The mobile terminal 100 includes a processor 110 and biological recognition modules 120. The number of the biological recognition modules 120 is at least two, and the biological recognition modules 120 may be fingerprint recognition modules, face recognition modules, iris recognition modules, voiceprint recognition modules, vein recognition modules, etc.

In the embodiments of the disclosure, the processor 110 connects the at least two biological recognition modules 120 through a bus 140, and the processor 110 and the biological recognition modules 120 may communicate with each other through the bus 140.

In the embodiments of the disclosure, the processor may be a Central Processing Unit (CPU). In some implementation manners, it may also be referred to as an Application Processor (AP) to distinguish from a baseband processor.

In the embodiments of the disclosure, the processor 110 is configured to notify, if it is determined that an operation requested by a user is of a preset operation type, the biological recognition modules 120 to acquire biological information of the user.

The biological recognition modules 120 are configured to acquire N pieces of biological information of the user, and transmit the N pieces of biological information to the processor 110.

The processor 110 is further configured to match each of the N pieces of biological information with a respective one of preset biological information templates, and perform, if each of the N pieces of biological information is successfully matched with the respective one of the preset biological information templates, the operation requested by the user.

In the embodiments of the disclosure, the mobile terminal 100 may receive the input of the user through a touch display screen, a physical button and the like, and parse the input of the user to determine the operation requested by the user. For example, the operation requested by the user may be unlocking a screen, opening an application, paying for an order, and the like. The above preset operation type may be an operation that requires high security, such as paying for an order, viewing an album, opening a chat application, viewing a chat history, and opening a mailbox. The characteristics of these operations are that they involve private information or property information of the user, so the security requirements are high.

As an optional implementation manner, the user may set some operations to the preset operation type according to their own needs; or, the mobile terminal may preset system settings, and in the system settings, some operations have been set to the preset operation type.

In the embodiments of the disclosure, the biological recognition modules 120 acquire N pieces of biological information of the user. The N pieces of biological information are different types of biological information. For example, if the mobile terminal 100 includes two biological recognition modules, namely a fingerprint recognition module and a voiceprint recognition module, the two biological recognition modules acquire two pieces of biological recognition information (fingerprint information and voiceprint information). At this time, N=2.

In the embodiments of the disclosure, according to the type of the biological recognition module provided by the mobile terminal 100, each of preset biological recognition information templates corresponding to the type of a respective one of the biological recognition modules is pre-stored in a memory of the mobile terminal 100. For example, if the mobile terminal 100 includes two biological recognition modules, namely a fingerprint recognition module and a voiceprint recognition module, the mobile terminal 100 pre-stores a fingerprint information template and a voiceprint information template for matching biological information input by the user to verify whether the user is a legal user and whether there is a permission to perform an operation of a preset operation type.

When the N pieces of biological information of the user are all successfully matched with the preset biological information templates, it is determined that the user has a permission to perform the operation of the preset operation type, so that the mobile terminal 100 completes the operation requested by the user.

It can be seen that in the mobile terminal described in FIG. 1, a user can perform an operation of a preset operation type only under the condition that N pieces of biological information are all successfully matched, so that the security of a mobile terminal can be improved, and information leakage or property loss caused by the mobile terminal being maliciously operated can be avoided.

Figure 2:
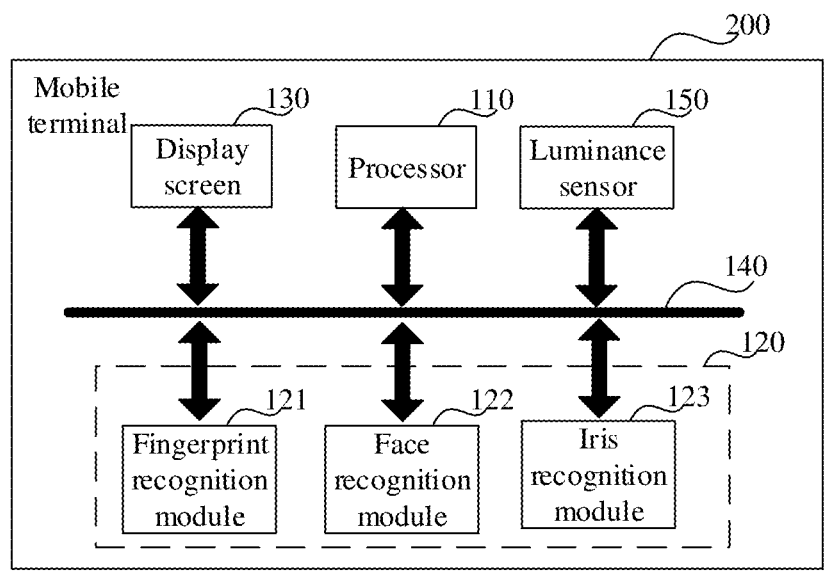
FIG. 2 is a structure diagram of another mobile terminal according to an embodiment of the disclosure.

Please refer to FIG. 2. FIG. 2 is a structure diagram of another mobile terminal 200 according to an embodiment of the disclosure. The mobile terminal shown in FIG. 2 may be obtained on the basis of the mobile terminal shown in FIG. 1. Compared with the mobile terminal described in FIG. 1, the mobile terminal shown in FIG. 2 further includes a display screen 130 and a luminance sensor 150. In addition, the at least two biological recognition modules 120 include a fingerprint recognition module 121, a face recognition module 122 and an iris recognition module 123. In the embodiments of the disclosure, for example, the at least two biological recognition modules 120 include only the fingerprint recognition module 121, the face recognition module 122 and the iris recognition module 123. It can be understood that in other embodiments, the vein recognition module, the voiceprint recognition module and the like may be included, which will not be limited in the embodiments of the disclosure.

In the embodiments of the disclosure, the processor 110, the fingerprint recognition module 121, the face recognition module 122, the iris recognition module 123, the display screen 130, and the luminance sensor 150 are all connected to the bus 140, so that the above parts may communicate with each other.

In the embodiments of the disclosure, when a user needs to verify multiple pieces of biological information to perform an operation, one of the biological information may not be successfully verified due to a certain reason, and thus the desired operation cannot be completed. For example, the user may be in a darker environment, resulting in insufficient facial illumination to verify face recognition; or the user's fingers are too wet to verify fingerprint recognition; or the user wears contact lenses, which cannot complete the verification of iris recognition.

Therefore, while improving the security of the operation of the mobile terminal, it is also necessary to consider the execution success rate of the user's operation. In the embodiments of the disclosure, when only one of multiple pieces of biological information is not successfully verified, the biological information verification may be replaced by using password or secret question verification to ensure that the operation desired by the user can be performed smoothly.

In the embodiments of the disclosure, the mobile terminal 200 performs the above operations in the following manner.

The processor 110 is further configured to notify, if N−1 pieces of biological information in the N pieces of biological information are successfully matched and one piece of biological information is not successfully matched, the display screen 130 to output a password input interface.

The display screen 130 is configured to output the password input interface. The processor 110 is further configured to verify password information input by the user, and perform, if the password information input by the user is successfully verified, the operation requested by the user.

In the embodiments of the disclosure, if the biological recognition modules included in the mobile terminal 200 are the fingerprint recognition module 121, the face recognition module 122 and the iris recognition module 123, the acquired N pieces of biological information are fingerprint information, face information and iris information, and the preset biological information templates in the embodiments of the disclosure are a fingerprint information template, a face information template and an iris information template.

Figure 3:
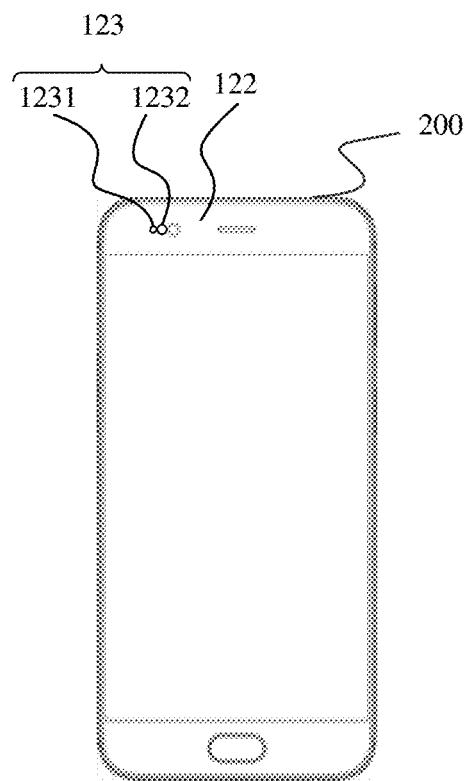
FIG. 3 is a structure diagram of another mobile terminal according to an embodiment of the disclosure.

Please refer to FIG. 3. FIG. 3 is a structure diagram of a mobile terminal 200 according to an embodiment of the disclosure. As shown in FIG. 3, the face recognition module 122 and the iris recognition module 123 may be located above the display screen 130, and the fingerprint recognition module 121 may be located below the display screen 130 and may be integrated with a HOME key.

The face recognition module 122 may be a front camera. In addition to a face recognition function, the functions of a conventional camera such as photographing or shooting video can be realized.

The iris recognition module 123 may be composed of an infrared fill light 1231 and an infrared camera 1232. In the iris recognition, the infrared light emitted by the infrared fill light 1231 is irradiated on an iris, and is reflected back to the infrared camera 1232 through the iris, so that the infrared camera 1232 may collect an iris image.

According to the principle that the iris recognition module 123 recognizes by infrared rays, the iris recognition may be successfully completed when the ambient light intensity is weak or even when it is in a dark environment.

Figure 4:
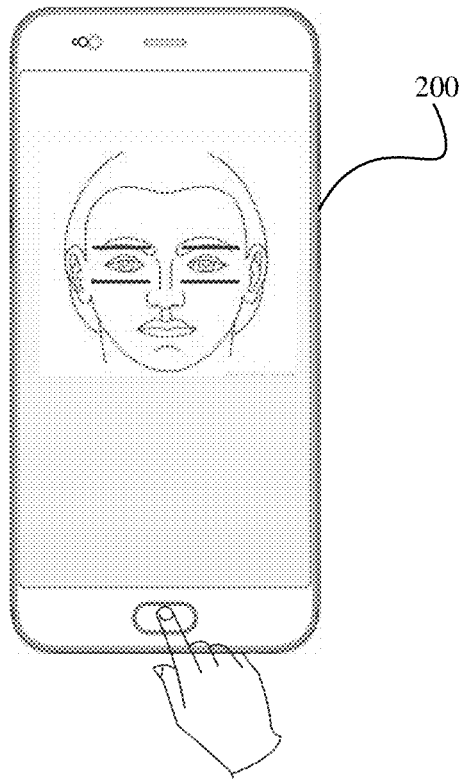
FIG. 4 is a diagram of a biological recognition interface according to an embodiment of the disclosure.

Please refer to FIG. 4. FIG. 4 is an interface diagram of a mobile terminal 200 simultaneously performing fingerprint recognition, face recognition and iris recognition according to an embodiment of the disclosure. As can be seen from FIG. 4, while putting a finger on the fingerprint recognition module for fingerprint recognition, the user may look at the upper part of the mobile terminal 200 horizontally, so that the front camera and the infrared camera located at the upper part of the mobile terminal 200 may acquire a color face image and a black-and-white eye image of the user, thereby simultaneously performing fingerprint recognition, face recognition and iris recognition to improve the execution speed of various biological information recognition.

As an optional implementation manner, when the three types of biological recognition are performed at the same time, the display screen of the mobile terminal 200 may be illuminated, a face image of the user acquired by the front camera is displayed on the display screen, and an appropriate position of an eye region during the iris recognition is identified by a dotted line frame on the display screen, so that the user can adjust the angle and distance of the face information and the iris information input according to the image on the display screen, thereby quickly completing iris recognition and face recognition.

When the operation of the preset operation type is performed and the fingerprint information, iris information and face information need to be verified at the same time, there may be a situation "the fingerprint information is successfully matched with the fingerprint information template, the face information is successfully matched with the face information template, and the iris information is not successfully matched with the iris information template":

The processor 110 is further configured to: analyze the iris information acquired by the iris recognition module 123 to determine whether the user wears contact lenses; acquire, if the user wears contact lenses, texture feature information of the contact lenses, and compare the texture feature information of the contact lenses with historical texture feature information cached by the processor 110 to determine whether the texture feature information of the contact lenses is consistent with the historical texture feature information; and confirm, if the texture feature information of the contact lenses is consistent with the historical texture feature information, whether historical password information corresponding to the historical texture feature information is successfully verified, and perform, if the historical password information is successfully verified, the operation requested by the user.

In the above implementation manner, for the case where only the iris information is not successfully verified in the biological information of the user, it is analyzed whether the user currently wears contact lenses. If the user currently wears the contact lenses, it indicates that iris recognition verification fails due to the patterns of the contact lenses. Therefore, the mobile terminal 200 may acquire the historical texture feature information of the contact lenses when the user last wears the contact lenses for verification and the historical password information input due to the failure of the iris recognition verification; if the current patterns of the contact lenses of the user are consistent with the historical texture feature information, it is presumed that the current user is the same person as the user who last verified with the contact lenses. Therefore, if the historical password information input by the user has passed the verification, it may be presumed that the current user also has a permission to perform the operation of the preset operation type. Thus, in the present verification, the password verification may be skipped, and the operation requested by the user may be directly performed, thereby shortening the time required for the identity verification of the user, improving the execution efficiency of the mobile terminal, and bringing a smoother and faster user experience.

When the operation of the preset operation type is performed and the fingerprint information, iris information and face information need to be verified at the same time, there may be a situation "the fingerprint information successfully is matched with the fingerprint information template, the iris information is successfully matched with the iris information template, and the face information is not successfully matched with the face information template".

The luminance sensor 150 is configured to acquire ambient light luminance of the mobile terminal 200, and transmit the ambient light luminance to the processor 110.

The processor 110 is further configured to perform, if the ambient light luminance is lower than a light intensity threshold, the operation of notifying the display screen 130 to output a password input interface. On the other hand, if the ambient light luminance is equal to or higher than the light intensity threshold, the processor 110 notifies the display screen 130 to output prompt information to remind the user of no permission to perform the operation of the preset operation type.

The display screen 130 is further configured to output the prompt information. In the above implementation manner, if only the face recognition fails to pass the verification, the ambient light luminance may be insufficient, and feature information collected by the face recognition may be insufficient to be verified. Therefore, when only the face recognition is not verified, the ambient light luminance is acquired by using a light sensor. If the ambient light luminance is too low, the password input interface is output to prompt the user to input a password to complete the identity verification. On the other hand, if the ambient light luminance is sufficient to complete the face recognition, but the face recognition does not pass the verification, in order to improve the security of the operation of the mobile terminal, the operation requested by the user may be rejected, and the prompt information may be output to remind the user of no permission to perform the operation of the preset operation type.

It can be seen that the mobile terminal 200 described in FIG. 2 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

Figure 5:
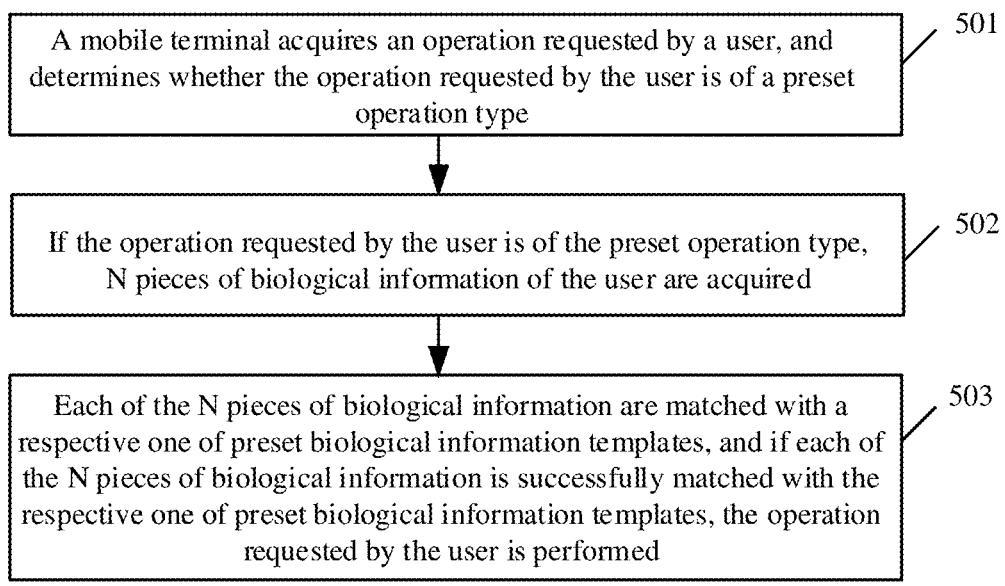
FIG. 5 is a flowchart of a permission control method according to an embodiment of the disclosure.

Please refer to FIG. 5. FIG. 5 is a flowchart of a permission control method according to an embodiment of the disclosure. The permission control method may be executed by a mobile terminal. As shown in FIG. 5, the permission control method may include the following operations.

At 501, the mobile terminal acquires an operation requested by a user, and determines whether the operation requested by the user is of a preset operation type.

In the embodiments of the disclosure, the mobile terminal may receive the input of the user through a touch display screen, a physical button and the like, and parse the input of the user to determine the operation requested by the user. For example, the operation requested by the user may be unlocking a screen, opening an application, paying for an order, and the like. The above preset operation type may be an operation that requires high security, such as paying for an order, viewing an album, opening a chat application, viewing a chat history, and opening a mailbox. The characteristics of these operations are that they involve private information or property information of the user, so the security requirements are high.

At 502, if the operation requested by the user is of the preset operation type, N pieces of biological information of the user are acquired.

In the embodiments of the disclosure, the mobile terminal acquires N pieces of biological information of the user, where the N pieces of biological information are different types of biological information. For example, if the mobile terminal includes two biological recognition modules, namely a fingerprint recognition module and a voiceprint recognition module, each of the two biological recognition modules acquires a respective one of two pieces of biological recognition information (fingerprint information and voiceprint information). At this time, N=2.

At 503, each of the N pieces of biological information are matched with a respective one of preset biological information templates, and if each of the N pieces of biological information is successfully matched with the respective one of the preset biological information templates, the operation requested by the user is performed. In the embodiments of the disclosure, according to the type of the biological recognition module provided by the mobile terminal, each of the preset biological recognition information templates corresponding to the type of a respective one of the biological recognition modules is pre-stored in a memory of the mobile terminal. For example, if the mobile terminal includes two biological recognition modules, namely a fingerprint recognition module and a voiceprint recognition module, the mobile terminal pre-stores a fingerprint information template and a voiceprint information template for matching biological information input by the user to verify whether the user is a legal user and whether there is a permission to perform an operation of a preset operation type.

It can be seen that by using the method described in FIG. 5, a user can perform an operation of a preset operation type only under the condition that N pieces of biological information are all successfully matched, so that the security of a mobile terminal can be improved, and information leakage or property loss caused by the mobile terminal being maliciously operated can be avoided.

Figure 6:
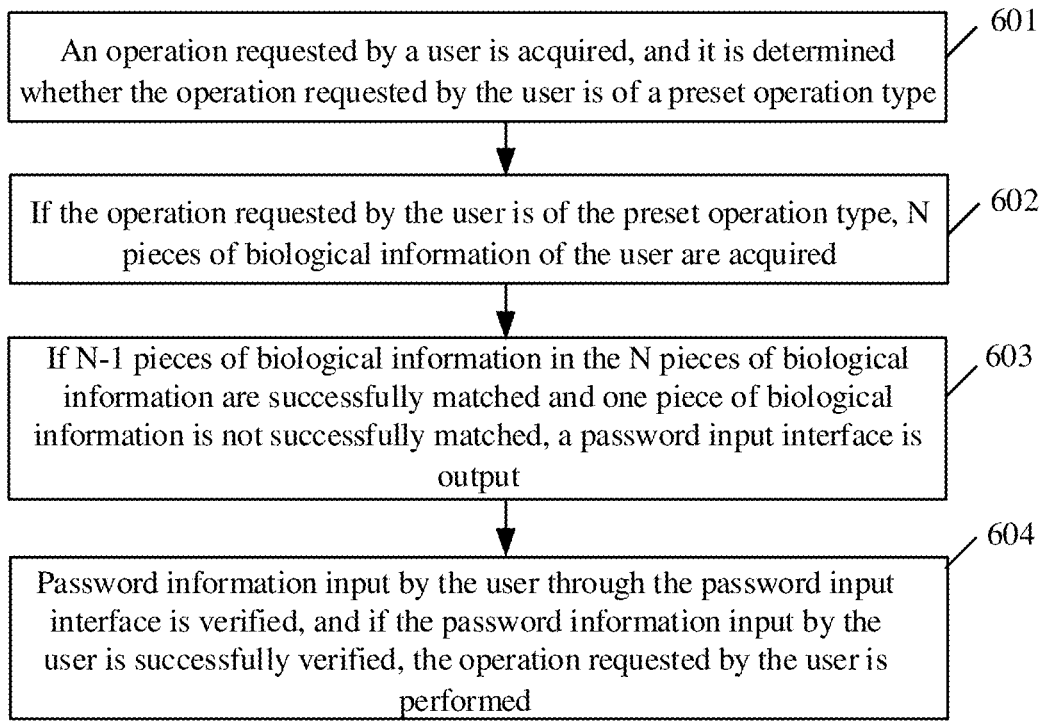
FIG. 6 is a flowchart of another permission control method according to an embodiment of the disclosure.

Please refer to FIG. 6. FIG. 6 is a flowchart of another permission control method according to an embodiment of the disclosure. As shown in FIG. 6, the permission control method may include the following operations.

At 601, an operation requested by a user is acquired, and it is determined whether the operation requested by the user is of a preset operation type.

At 602, if the operation requested by the user is of the preset operation type, N pieces of biological information of the user are acquired.

At 603, if N−1 pieces of biological information in the N pieces of biological information are successfully matched and one piece of biological information is not successfully matched, a password input interface is output.

In the embodiments of the disclosure, when only one of multiple pieces of biological information is not successfully verified, the biological information verification may be replaced by using password or secret question verification to ensure that the operation desired by the user can be performed smoothly.

At 604, password information input by the user through the password input interface is verified, and if the password information input by the user is successfully verified, the operation requested by the user is performed.

It can be seen that the method described in FIG. 6 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

Figure 7:
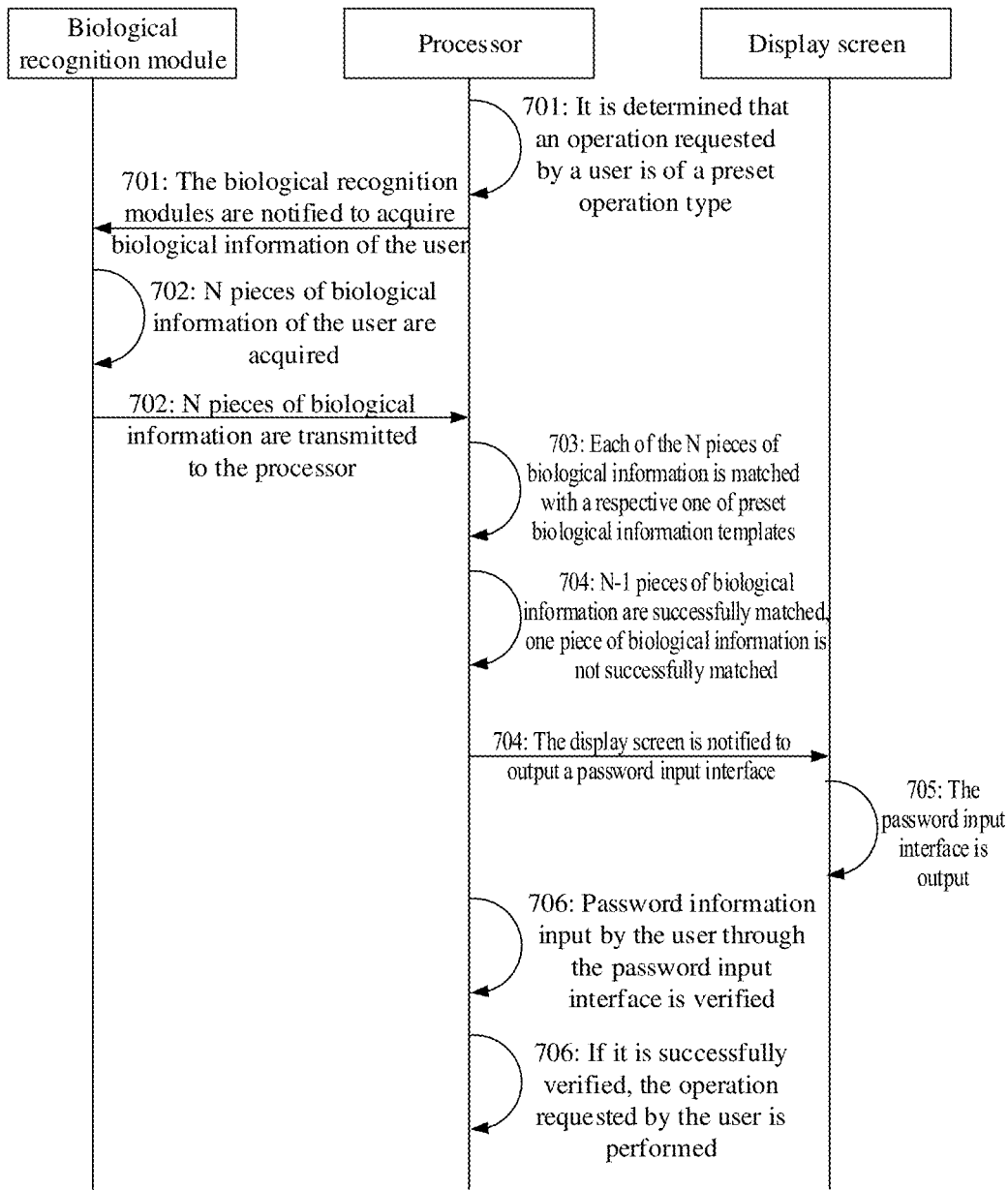
FIG. 7 is a flowchart of still another permission control method according to an embodiment of the disclosure.

Please refer to FIG. 7. FIG. 7 is a flowchart of still another permission control method according to an embodiment of the disclosure. The permission control method may be applied to a mobile terminal including a processor, biological recognition modules and a display screen. As shown in FIG. 7, the permission control method may include the following operations.

At 701, the processor notifies, if it is determined that an operation requested by a user is of a preset operation type, the biological recognition modules to acquire biological information of the user.

At 702, the biological recognition modules acquire N pieces of biological information of the user, and transmit the N pieces of biological information to the processor.

In the embodiments of the disclosure, the biological recognition modules may be an integrated hardware device, and has the functions of recognizing various pieces of biological information such as fingerprint recognition, iris recognition and face recognition. Each of the biological recognition modules can recognize a corresponding one of N pieces of biological information. In the embodiments of the disclosure, the biological recognition modules acquire N pieces of biological information of the user.

As an optional implementation manner, the biological recognition modules may also be separately disposed biological recognition modules with different functions.

At 703, the processor matches each of the N pieces of biological information with a respective one of preset biological information templates.

At 704, if N−1 pieces of biological information in the N pieces of biological information are successfully matched and one piece of biological information is not successfully matched, the processor notifies the display screen to output a password input interface.

At 705, the display screen outputs the password input interface.

At 706, the processor verifies password information input by the user through the password input interface, and performs, if it is successfully verified, the operation requested by the user.

It can be seen that the method described in FIG. 7 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

Figure 8:
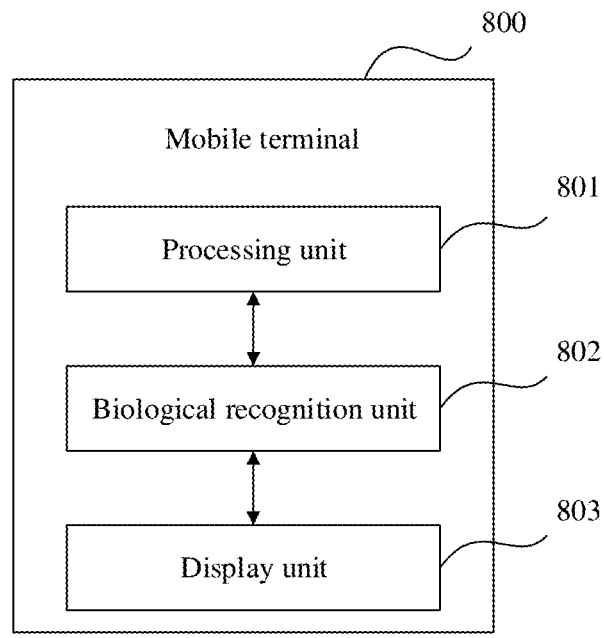
FIG. 8 is a composition block diagram of a functional unit of a mobile terminal according to an embodiment of the disclosure.

Please refer to FIG. 8. FIG. 8 is a composition block diagram of a functional unit of a mobile terminal 800 according to an embodiment of the disclosure. As shown in FIG. 8, the mobile terminal 800 may include a processing unit 801, a biological recognition unit 802 and a display unit 803.

The processing unit 801 is configured to notify, if it is determined that an operation requested by a user is of a preset operation type, the biological recognition unit 802 to acquire biological information of the user.

The biological recognition unit 802 is configured to acquire N pieces of biological information of the user, and transmit the N pieces of biological information to the processing unit 801.

The processing unit 801 is further configured to match each of the N pieces of biological information with a respective one of preset biological information templates, and perform, if each of the N pieces of biological information is successfully matched with the respective one of the preset biological information templates, the operation requested by the user.

The processing unit 801 is further configured to notify, if N−1 pieces of biological information in the N pieces of biological information are successfully matched and one piece of biological information is not successfully matched, the display unit 803 to output a password input interface.

The display unit 803 is configured to output the password input interface.

The processing unit 801 is further configured to verify password information input by the user, and perform, if the password information input by the user is successfully verified, the operation requested by the user.

It can be understood that, for realizing the functions, the mobile terminal includes corresponding hardware structures and/or software modules executing each function. Those skilled in the art may easily realize that the units and algorithm operations of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the mobile terminal may be divided according to the above-mentioned method examples. For example, each functional unit may be divided correspondingly to each function and two or more than two functions may also be integrated into a processing unit. The integrated unit may be implemented in a hardware form and may also be implemented in form of software functional unit. It is to be noted that division of the units in the embodiment of the disclosure is schematic and only logical function division and another division manner may be adopted during practical implementation.

As an optional implementation manner, the processing unit 801 may be a Central Processing Unit (CPU), a general-purpose processor, a Digital Signal Processor (DSP), an Application-Specific Integrated Circuit (ASIC), a Field Programmable Gate Array (FPGA), or other programmable logic devices, transistor logic devices, hardware components or any combination thereof. The biological recognition unit 802 may be a combination of a fingerprint recognition sensor, a camera, and an iris recognition module. The display unit 803 may be a display screen, a touch display screen, or the like.

It can be seen that the mobile terminal described in FIG. 8 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

Figure 9:
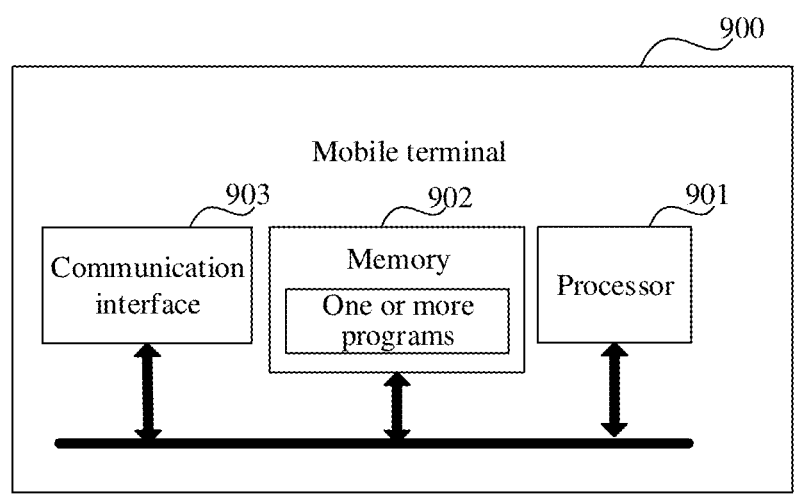
FIG. 9 is a structure diagram of another mobile terminal according to an embodiment of the disclosure.

Please refer to FIG. 9. FIG. 9 is a structure diagram of another mobile terminal according to an embodiment of the disclosure. As shown in the figure, the mobile terminal includes a processor 901, a memory 902, a communication interface 903 and one or more programs. The one or more programs are stored in the memory and configured to be executed by the processor. The programs include instructions configured to perform the operations in the above method embodiments.

For example, the program includes instructions for performing the following operations.

An operation requested by a user is acquired, and it is determined whether the operation requested by the user is of a preset operation type.

If the operation requested by the user is of the preset operation type, N pieces of biological information of the user are acquired, N being a positive integer more than 1.

Each of the N pieces of biological information is matched with a respective one of preset biological information templates, and if each of the N pieces of biological information is successfully matched with the respective one of preset biological information templates, the operation requested by the user is performed.

As an optional implementation manner, the program further includes instructions for performing the following operations.

If N−1 pieces of biological information in the N pieces of biological information are successfully matched and one piece of biological information is not successfully matched, a password input interface is output.

Password information input by the user through the password input interface is verified, and if the password information input by the user is successfully verified, the operation requested by the user is performed.

As an optional implementation manner, the more than one biological recognition module includes: a fingerprint recognition module, a face recognition module and an iris recognition module; the N pieces of biological information include: iris information, face information and fingerprint information; and the preset biological information template includes: an iris information template, a face information template and a fingerprint information template.

As an optional implementation manner, the situation that N−1 pieces of biological information in the N pieces of biological information are successfully matched and one piece of biological information is not successfully matched includes: the fingerprint information is successfully matched with the fingerprint information template, the face information is successfully matched with the face information template, and the iris information is not successfully matched with the iris information template.

The program further includes instructions for performing the following operations.

If the fingerprint information is successfully matched with the fingerprint information template, the face information is successfully matched with the face information template and the iris information is not successfully matched with the iris information template, the iris information is analyzed to determine whether the user wears contact lenses.

If the user wears contact lenses, texture feature information of the contact lenses is acquired and compared with historical texture feature information cached by the processor to determine whether the texture feature information of the contact lenses is consistent with the historical texture feature information.

If the texture feature information of the contact lenses is consistent with the historical texture feature information, it is confirmed whether historical password information corresponding to the historical texture feature information is successfully verified, and if the historical password information is successfully verified, the operation requested by the user is performed.

As an optional implementation manner, the situation that N−1 pieces of biological information in the N pieces of biological information are successfully matched and one piece of biological information is not successfully matched includes: the fingerprint information is successfully matched with the fingerprint information template, the iris information is successfully matched with the iris information template, and the face information is not successfully matched with the face information template.

The program further includes instructions for performing the following operations.

If the fingerprint information is successfully matched with the fingerprint information template, the iris information is successfully matched with the iris information template and the face information is not successfully matched with the face information template, ambient light luminance of the mobile terminal is acquired.

If the ambient light luminance is lower than a light intensity threshold, the operation of outputting a password input interface is performed, and if the ambient light luminance is equal to or higher than the light intensity threshold, prompt information is output to remind the user of no permission to perform the operation of the preset operation type.

It can be seen that the mobile terminal described in FIG. 9 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

Figure 10:
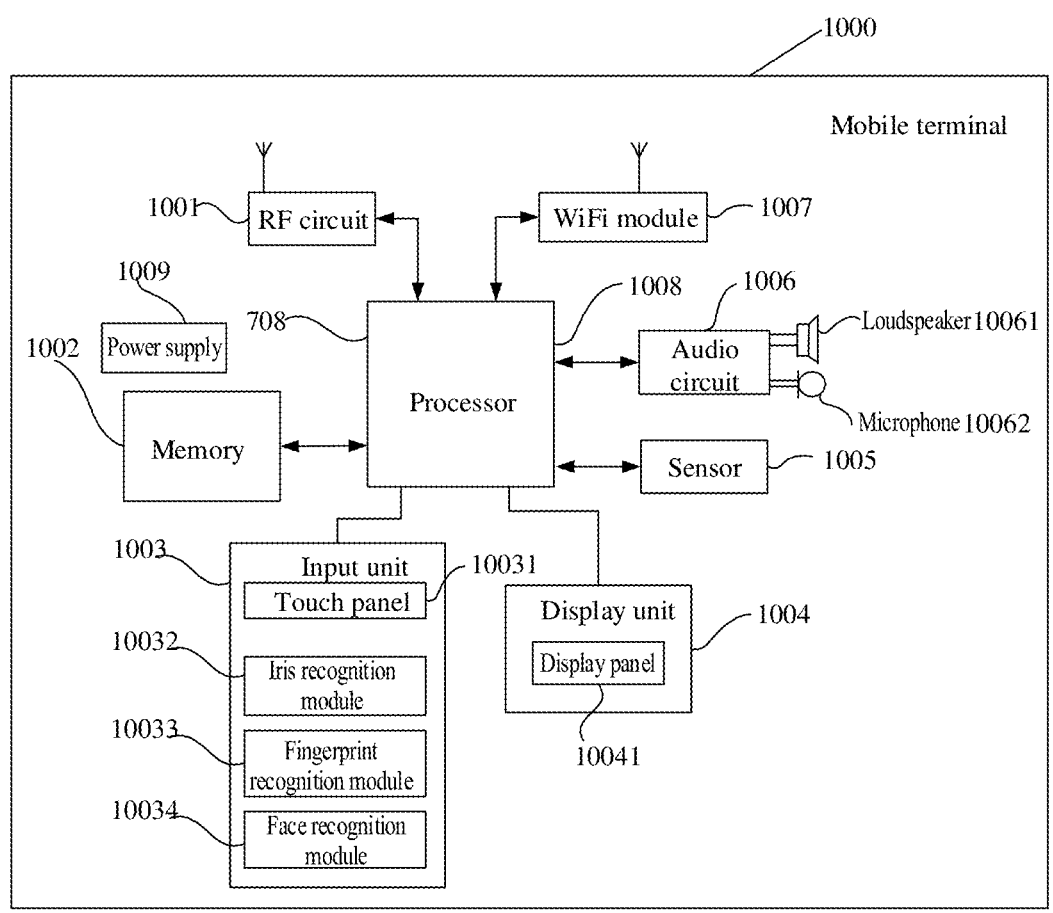
FIG. 10 is a structure diagram of another mobile terminal according to an embodiment of the disclosure.

Please refer to FIG. 10. FIG. 10 is a structure diagram of another mobile terminal according to an embodiment of the disclosure. As shown in FIG. 10, for convenient description, only parts related to the embodiment of the disclosure are illustrated and specific technical details that are not disclosed refer to the parts of the method in the embodiments of the disclosure. The terminal may be any mobile terminal including a mobile phone, a Personal Digital Assistant (PDA), a Point of Sales (POS), a vehicle-mounted computer and the like. For example, the mobile terminal is a mobile phone.

FIG. 10 is a block diagram of a partial structure of a mobile phone associated with a mobile terminal according to an embodiment of the disclosure. Referring to FIG. 10, the mobile phone includes: a Radio Frequency (RF) circuit 1001, a memory 1002, an input unit 1003, a display unit 1004, a sensor 1005, an audio circuit 1006, a Wireless Fidelity (WiFi) module 1007, a processor 1008, a power supply 1009, and other parts. A person skilled in the art may understand that a mobile phone structure shown in FIG. 10 is not limitative to the mobile phone, and the mobile phone may include parts more or fewer than those shown in the figure, or combine some parts, or have different part arrangements.

Each component of the mobile phone will be specifically introduced below in combination with FIG. 10.

The RF circuit 1001 may be configured to receive and send a signal during information receiving and transmitting or during a call, may specifically receive downlink information of a base station and then send the information to the processor 1008 for processing, or may additionally send uplink data to the base station. Usually, the RF circuit 1001 includes, but is not limited to, an antenna, at least one amplifier, a transceiver, a coupler, a Low Noise Amplifier (LNA), a duplexer, etc. In addition, the RF circuit 1001 may further communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 1002 may be configured to store a software program and a module, and the processor 1008 executes various function APPs and data processing of the mobile phone by running the software program and the module stored in the memory 1002. The memory 1002 may mainly include a storage program area and a storage data area, where the storage program area may store an operating system, an application program required for at least one function (such as a sound playing function and an image playing function); and the storage data area may store data (such as audio data and phone books) created according to the use of the mobile phone. In addition, the memory 1002 may include a high-speed RAM, and may further include a non-volatile memory such as a disk storage device, a flash device, or other non-volatile solid storage devices.

The input unit 1003 may be configured to receive input digital or character information and generate key signal input associated with user setting and functional control of the mobile phone. Specifically, the input unit 1003 may include a touch panel 10031, an iris recognition module 10032, a fingerprint recognition module 10033, and a face recognition module 10034. The touch panel 10031 also referred to as a touch screen may collect touch operations of a user thereon or nearby (such as an operation of the user on the touch panel 10031 or nearby the touch panel 10031 by using any suitable objects or attachments such as a finger or a stylus), and drives a corresponding connecting apparatus according to a preset program. Optionally, the touch panel 10031 may include a touch detection apparatus and a touch controller. The touch detection apparatus detects the touch orientation of the user, detects a signal brought by the touch operation, and transmits the signal to the touch controller; and the touch controller receives touch information from the touch detection apparatus, converts it to touch coordinates, transmits the touch coordinates to the processor 1008, and can receive a command sent by the processor set 1008 and execute the command. In addition, the touch panel 10031 may be implemented by using multiple types such as resistance, capacitance, infrared rays and surface acoustic wave. In addition to the touch panel 10031, the input unit 1003 may further include an iris recognition module 10032, a fingerprint recognition module 10033 and a face recognition module 10034, for receiving iris information, fingerprint information and face information input by a user to recognize the identity of the user, thereby controlling the use permission of the mobile terminal.

The display unit 1004 may be configured to display information input by the user or information provided for the user or various menus of the mobile phone. The display unit 1004 may include a display panel 10041. Optionally, the display panel 10041 may be configured in a form of a Liquid Crystal Display (LCD), an Organic Light-Emitting Diode (OLED), etc. Further, the touch panel 10031 may cover the display panel 10041, when the touch panel 10031 detects the touch operation thereon or nearby, the touch operation is transmitted to the processor set 1008 to determine the type of a touch event, and then the processor set 1008 provides a corresponding visual output on the display panel 10041 according to the type of the touch event. Although the touch panel 10031 and the display panel 10041 implement input of the mobile phone and input functions by serving as two independent parts in FIG. 10, the touch panel 10031 and the display panel 10041 may be integrated to implement the input of the mobile phone and the input functions in some embodiments.

The mobile phone may further include at least one sensor 1005 such as a light sensor, a motion sensor and other sensors. Specifically, the light sensor may include an ambient light sensor and a proximity sensor, wherein the ambient light sensor may adjust the luminance of the display panel 10041 according to the brightness of ambient light, and the proximity sensor may close the display panel 10041 and/or backlight. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 1006, a loudspeaker 10061 and a microphone 10062 may provide an audio interface between the user and the mobile phone. The audio circuit 1006 may transmit an electric signal converted from the received audio data to the loudspeaker 10061, and the loudspeaker 10061 converts the electric signal into a sound signal for output. Besides, the microphone 10062 converts a collected sound signal into an electric signal, the audio circuit 1006 converts the received electric signal into audio data and then outputs the audio data to the processor set 1008 for processing, the audio data is transmitted to, for example, another mobile phone via the RF circuit 1001, or the audio data is output to the memory 1002 for further processing.

WiFi belongs to a short-range wireless transmission technology, the mobile phone may assist the user in E-mail receiving and sending, webpage browsing, access to streaming media and the like by means of the WiFi module 1007, and it provides a wireless wideband internet access for the user. Although FIG. 10 shows the WiFi module 1007, it may be understood that the WiFi module does not belong to necessary components of the mobile phone and can be omitted completely as required within the scope of not changing the essence of the disclosure.

The processor 1008 is a control center of the mobile phone, and the processor 1008 connects all parts of the whole mobile phone by utilizing various interfaces and lines, to run or execute the software program and/or the module stored in the memory 1002, and to call data stored in the memory 1002 to execute various functions and processing data of the mobile phone, so as to wholly monitor the mobile phone. Optionally, the processor 1008 may include one or more processing units. Preferably, the processor 1008 may be integrated with an application processor and a modulation-demodulation processor, wherein the application processor mainly processes an operation system, a user interface, an application program and the like, and the modulation-demodulation processor mainly processes wireless communication. It may be understood that the modulation-demodulation processor may not be integrated into the processor 1008.

The mobile phone may further include a power supply 1009 (such as a battery) for supplying power to each component. Preferably, the power supply may be connected with the processor 1008 logically via a power supply management system, so as to implement functions of charging, discharging and power consumption management by means of the power supply management system.

Although not shown, the mobile phone may further include a camera, a Bluetooth module, and the like, and details are not described herein.

In the embodiment shown in FIG. 5 to FIG. 7, the flow in each operation of the method may be implemented based on the structure of the mobile phone.

In the embodiment shown in FIG. 8, each unit function may be implemented based on the structure of the mobile phone.

It can be seen that the mobile terminal described in FIG. 10 may acquire a password input by a user and verify the password to determine whether the user has a permission to perform an operation of a preset operation type when only one of multiple pieces of biological information cannot be successfully verified. Thus, while ensuring the security of the operation of the mobile terminal, it is guaranteed that an operation desired by a user who has a permission can be smoothly performed.

An embodiment of the disclosure also provides a computer-readable storage medium, which stores computer programs configured for electronic data exchange, the computer programs enabling a computer to perform part or all of the operations of any method recorded in the method embodiment and the computer including a mobile terminal.

Specifically, in an embodiment of the disclosure, a computer-readable storage medium is provided, which stores computer programs configured for electronic data exchange, the computer programs enabling a computer to perform the following operations.

An operation requested by a user is acquired, and it is determined whether the operation requested by the user is of a preset operation type.

If the operation requested by the user is of the preset operation type, N pieces of biological information of the user are acquired, N being a positive integer more than 1.

Each of the N pieces of biological information is matched with a respective one of preset biological information templates, and if each of the N pieces of biological information is successfully matched with the respective one of the preset biological information templates, the operation requested by the user is performed.

Optionally, the computer programs also enable the computer to perform the following operations.

If N−1 pieces of biological information in the N pieces of biological information are successfully matched and one piece of biological information is not successfully matched, a password input interface is output.

Password information input by the user through the password input interface is verified, and if the password information input by the user is successfully verified, the operation requested by the user is performed.

Optionally, the more than one biological recognition module includes: a fingerprint recognition module, a face recognition module and an iris recognition module; the N pieces of biological information include: iris information, face information and fingerprint information; and the preset biological information template includes: an iris information template, a face information template and a fingerprint information template.

Optionally, the situation that N−1 pieces of biological information in the N pieces of biological information are successfully matched and one piece of biological information is not successfully matched includes: the fingerprint information is successfully matched with the fingerprint information template, the face information is successfully matched with the face information template, and the iris information is not successfully matched with the iris information template.

If the fingerprint information is successfully matched with the fingerprint information template, the face information is successfully matched with the face information template and the iris information is not successfully matched with the iris information template, the iris information is analyzed to determine whether the user wears contact lenses.

If the user wears contact lenses, texture feature information of the contact lenses is acquired and compared with historical texture feature information cached by the processor to determine whether the texture feature information of the contact lenses is consistent with the historical texture feature information.

If the texture feature information of the contact lenses is consistent with the historical texture feature information, it is confirmed whether historical password information corresponding to the historical texture feature information is successfully verified, and if the historical password information is successfully verified, the operation requested by the user is performed.

Optionally, the situation that N−1 pieces of biological information in the N pieces of biological information are successfully matched and one piece of biological information is not successfully matched includes: the fingerprint information is successfully matched with the fingerprint information template, the iris information is successfully matched with the iris information template, and the face information is not successfully matched with the face information template.

If the fingerprint information is successfully matched with the fingerprint information template, the iris information is successfully matched with the iris information template and the face information is not successfully matched with the face information template, ambient light luminance of the mobile terminal is acquired.

If the ambient light luminance is lower than a light intensity threshold, the operation of outputting a password input interface is performed, and if the ambient light luminance is equal to or higher than the light intensity threshold, prompt information is output to remind the user of no permission to perform the operation of the preset operation type.

Optionally, the preset operation type includes an operation involving privacy information or property information of the user.

Specifically, the operation involving privacy information or property information of the user includes: paying for an order, viewing an album, opening a chat application, viewing a chat history, and opening a mailbox.

Optionally, the computer programs enable the computer to perform the following operations.

The input of the user is received through a touch display screen, a physical button and the like, and the input of the user is parsed to determine the operation requested by the user.

An embodiment of the disclosure also provides a computer program product. The computer program product includes a non-transitory computer-readable storage medium storing computer programs. The computer programs may be operated to enable a computer to perform part or all of the operations of any method recorded in the method embodiment. The computer program product may be a software installation package, and the computer includes a mobile terminal.

It is to be noted that, for simple description, each above method embodiment is expressed as a combination of a series of actions. However, those skilled in the art should know that the disclosure is not limited to a described action sequence because some operations may be performed in another sequence or at the same time according to the disclosure. Second, those skilled in the art should also know that all the embodiments described in the specification are preferred embodiments and involved actions and modules are optional for the disclosure.

Each embodiment in the embodiments is described with different particular emphases, and parts which are not elaborated in a certain embodiment may refer to related descriptions of the other embodiments.

In some embodiments provided by the application, it should be understood that the disclosed device may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form, and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a computer device (which may be a personal computer, a server, a network device or the like) to perform all or part of the operations of the method in each embodiment of the disclosure. The memory includes: various media capable of storing program codes such as a U disk, a mobile hard disk, a Read-Only Memory (ROM), a RAM, a mobile hard disk, a magnetic disk or an optical disk.

Those of ordinary skill in the art may understand that all or part of the operations in each method of the embodiments may be completed by instructing, through a program, related hardware, the program may be stored in a computer-readable memory, and the memory may include a flash disk, a ROM, a RAM, a magnetic disk, an optical disk or the like.

The embodiments of the disclosure are introduced above in detail. The principle and implementation modes of the disclosure are elaborated in the specification with specific examples. The embodiments are described above only to help the method of the disclosure and the core concept thereof to be understood. In addition, those skilled in the art may make variations to the specific implementation modes and the scope of application according to the concept of the disclosure. To sum up, the contents of the specification should not be understood as limits to the disclosure.

The invention claimed is:

1. A mobile terminal, comprising a processor and a plurality of biological recognition modules, the processor being connected to the plurality of biological recognition modules, wherein
the processor is configured to notify, responsive to determining that an operation requested by a user is of a preset operation type, the plurality of biological recognition modules to acquire biological information of the user;
the plurality of biological recognition modules are configured to acquire N pieces of biological information of the user, and transmit the N pieces of biological information to the processor, N being a positive integer more than 1; and
the processor is further configured to match each of the N pieces of biological information with a respective one of preset biological information templates, and perform, responsive to each of the N pieces of biological information being successfully matched with the respective one of preset biological information templates, the operation requested by the user.

2. The mobile terminal according to claim 1, further comprising a display screen, the display screen being connected to the processor, wherein
the processor is further configured to notify, responsive to N-1 pieces of biological information in the N pieces of biological information being successfully matched and one piece of biological information being not successfully matched, the display screen to output a password input interface;
the display screen is configured to output the password input interface; and
the processor is further configured to verify password information input by the user, and perform, responsive to the password information input by the user being successfully verified, the operation requested by the user.

3. The mobile terminal according to claim 2, wherein the plurality of biological recognition modules comprise: a fingerprint recognition module, a face recognition module and an iris recognition module; the N pieces of biological information comprise: iris information, face information and fingerprint information; and the preset biological information templates comprise: an iris information template, a face information template and a fingerprint information template.

4. The mobile terminal according to claim 3, wherein responsive to the fingerprint information being successfully matched with the fingerprint information template, the face information being successfully matched with the face information template, and the iris information being not successfully matched with the iris information template;
the processor is further configured to analyze, responsive to the fingerprint information being successfully matched with the fingerprint information template, the face information being successfully matched with the face information template and the iris information being not successfully matched with the iris information template, the iris information to determine whether the user wears contact lenses;
the processor is further configured to acquire, responsive to the user wearing contact lenses, texture feature information of the contact lenses, and compare the texture feature information of the contact lenses with historical texture feature information cached by the processor to determine whether the texture feature information of the contact lenses is consistent with the historical texture feature information; and
the processor is further configured to confirm, responsive to the texture feature information of the contact lenses being consistent with the historical texture feature information, whether historical password information corresponding to the historical texture feature information is successfully verified, and perform, responsive to the historical password information being successfully verified, the operation requested by the user.

5. The mobile terminal according to claim 3, further comprising a luminance sensor, the luminance sensor being connected to the processor, wherein
responsive to the fingerprint information being successfully matched with the fingerprint information template, the iris information being successfully matched with the iris information template, and the face information being not successfully matched with the face information template;
the luminance sensor is configured to acquire, responsive to the fingerprint information being successfully matched with the fingerprint information template, the iris information being successfully matched with the iris information template and the face information being not successfully matched with the face information template, ambient light luminance of the mobile terminal, and transmit the ambient light luminance to the processor;
the processor is further configured to perform, responsive to the ambient light luminance being lower than a light intensity threshold, an operation of notifying the display screen to output the password input interface, and notify, responsive to the ambient light luminance being equal to or higher than the light intensity threshold, the display screen to output prompt information to remind the user of no permission to perform the operation of the preset operation type; and
the display screen is further configured to output the prompt information.

6. The mobile terminal according to claim 1, wherein the preset operation type comprises an operation involving privacy information or property information of the user.

7. The mobile terminal according to claim 1, wherein the N pieces of biological information are different types of biological information.

8. The mobile terminal according to claim 1, wherein the N pieces of biological information are at least two of the following information: fingerprint information, face information, iris information, vein information, or voiceprint information.

9. The mobile terminal according to claim 8, wherein the plurality of biological recognition modules are at least two of the following modules: a fingerprint recognition module, a face recognition module, an iris recognition module, a vein recognition module, or a voiceprint recognition module.

10. A permission control method, comprising:
acquiring an operation requested by a user, and determining whether the operation requested by the user is of a preset operation type;
acquiring, responsive to the operation requested by the user being of the preset operation type, N pieces of biological information of the user, N being a positive integer more than 1; and
matching each of the N pieces of biological information with a respective one of preset biological information templates, and performing, responsive to each of the N pieces of biological information being successfully matched with the respective one of preset biological information templates, the operation requested by the user.

11. The method according to claim 10, further comprising:
outputting, responsive to N-1 pieces of biological information in the N pieces of biological information being successfully matched and one piece of biological information being not successfully matched, a password input interface; and
verifying password information input by the user through the password input interface, and performing, responsive to the password information input by the user being successfully verified, the operation requested by the user.

12. The method according to claim 11, wherein the N pieces of biological information are acquired by a plurality of biological recognition modules; the plurality of biological recognition modules comprise: a fingerprint recognition module, a face recognition module and an iris recognition module; the N pieces of biological information comprise: iris information, face information and fingerprint information; and the preset biological information templates comprise: an iris information template, a face information template and a fingerprint information template.

13. The method according to claim 12, wherein the situation that N-1 pieces of biological information in the N pieces of biological information being successfully matched and one piece of biological information being not successfully matched comprises: the fingerprint information is successfully matched with the fingerprint information template, the face information is successfully matched with the face information template, and the iris information is not successfully matched with the iris information template;
responsive to the fingerprint information being successfully matched with the fingerprint information template, the face information being successfully matched with the face information template and the iris information being not successfully matched with the iris information template, the iris information is analyzed to determine whether the user wears contact lenses;
responsive to the user wearing contact lenses, acquiring texture feature information of the contact lenses, and comparing the texture feature information of the contact lenses with historical texture feature information cached by the processor to determine whether the texture feature information of the contact lenses is consistent with the historical texture feature information; and
responsive to the texture feature information of the contact lenses being consistent with the historical texture feature information, confirming whether historical password information corresponding to the historical texture feature information is successfully verified; and
responsive to the historical password information being successfully verified, performing the operation requested by the user.

14. The method according to claim 12, wherein the situation that N-1 pieces of biological information in the N pieces of biological information being successfully matched and one piece of biological information being not successfully matched comprises: the fingerprint information is successfully matched with the fingerprint information template, the iris information is successfully matched with the iris information template, and the face information is not successfully matched with the face information template;
responsive to the fingerprint information being successfully matched with the fingerprint information template, the iris information being successfully matched with the iris information template and the face information being not successfully matched with the face information template, acquiring ambient light luminance of the mobile terminal; and
responsive to the ambient light luminance is lower than a light intensity threshold, performing an operation of outputting a password input interface, and responsive to the ambient light luminance being equal to or higher than the light intensity threshold, outputting prompt information to remind the user of no permission to perform the operation of the preset operation type.

15. The method according to claim 10, wherein the preset operation type comprises an operation involving privacy information or property information of the user.

16. The method according to claim 10, wherein the N pieces of biological information are different types of biological information.

17. The method according to claim 10, wherein the N pieces of biological information are at least two of the following information: fingerprint information, face information, iris information, vein information, or voiceprint information.

18. The method according to claim 17, wherein the N pieces of biological information are acquired by a plurality of biological recognition modules, and the plurality of biological recognition modules are at least two of the following modules: a fingerprint recognition module, a face recognition module, an iris recognition module, a vein recognition module, or a voiceprint recognition module.

19. A non-transitory computer-readable storage medium, storing computer programs configured for electronic data exchange, the computer programs enabling a computer to execute the followinq operations:
acquiring an operation requested by a user, and determining whether the operation requested by the user is of a preset operation type;
acquiring, responsive to the operation requested by the user being of the preset operation type, N pieces of biological information of the user, N being a positive integer more than 1; and
matching each of the N pieces of biological information with a respective one of preset biological information templates, and performing, responsive to each of the N pieces of biological information being successfully matched with the respective one of preset biological information templates, the operation requested by the user.

20. The computer-readable storage medium according to claim 19, wherein the operations further comprise:
outputting, responsive to N-1 pieces of biological information in the N pieces of biological information being successfully matched and one piece of biological information being not successfully matched, a password input interface; and verifying password information input by the user through the password input interface, and performing, responsive to the password information input by the user being successfully verified, the operation requested by the user.

* * * * *